Dec. 19, 1950   J. M. LAUNDER   2,535,016
DETACHABLE COUPLING
Filed Dec. 26, 1947   2 Sheets-Sheet 1
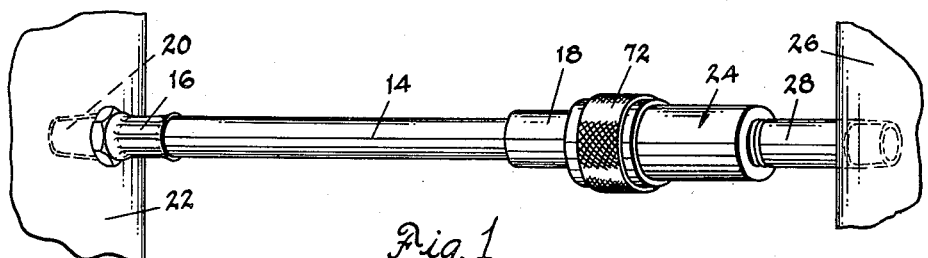
Fig. 1
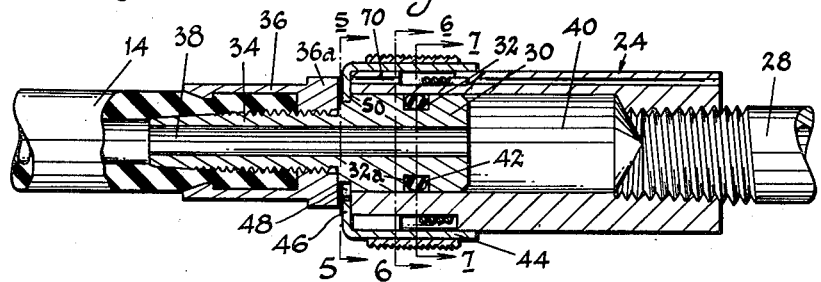
Fig. 2
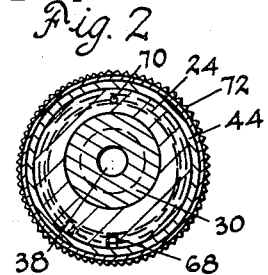 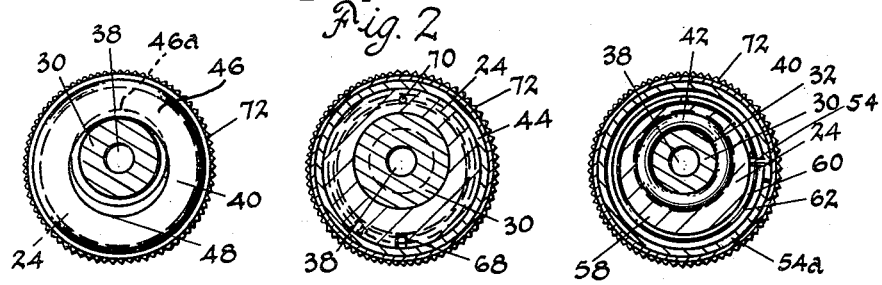 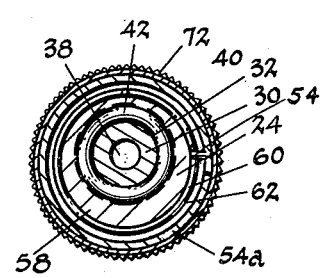
Fig. 5   Fig. 6   Fig. 7
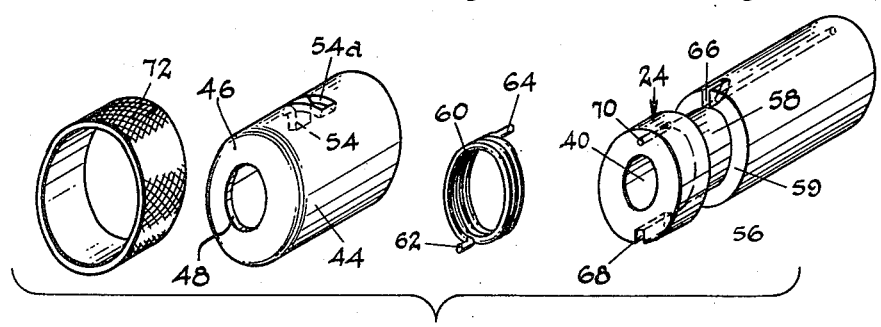
Fig. 3
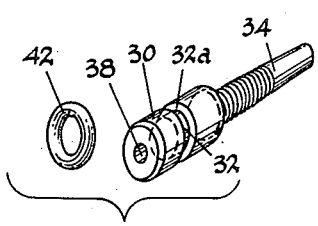
Fig. 4
INVENTOR.
JAMES MARK LAUNDER
BY
Falvey, Souther & Stoltenberg
ATTORNEYS Dec. 19, 1950         J. M. LAUNDER         2,535,016
DETACHABLE COUPLING Filed Dec. 26, 1947                              2 Sheets—Sheet 2

INVENTOR.
JAMES MARK LAUNDER
BY
Falvey, Souther & Stollenberg
ATTORNEYS

Patented Dec. 19, 1950

2,535,016

UNITED STATES PATENT OFFICE 2,535,016

DETACHABLE COUPLING

James Mark Launder, Toledo, Ohio, assignor to The Electric Auto-Lite Company, Toledo, Ohio, a corporation of Ohio Application December 26, 1947, Serial No. 794,068

7 Claims. (Cl. 285—97.3)

The invention relates to coupling devices for tubes or conduits and more particularly to a coupling by means of which the ends of conduits, adapted to convey fluids under pressure, are quickly connected or disconnected, and locked against accidental uncoupling.

The invention includes the provision of a leak-proof coupling for conduits providing unrestricted fluid flow communication and positive interlocking engagement of its separable ported male and female members avoiding their accidental separation.

The invention is concerned with a self-sealing swivel coupling, simple and rugged in construction, compact and light in weight, which is reliable over a wide range of fluid pressures and temperatures and by means of which tubular members are connected with the minimum of time and effort, and disconnected only by manual intervention.

The invention comprehends novel means for positively locking in engagement separable ported male and female members of a coupling, the components of said locking means being readily assembled without complicated operations or special tools and once assembled do not readily come apart.

The invention embraces a snap type tubular coupling of a minimum outside diameter for a given flow capacity incorporating a deformable ring of circular cross-section carried by a groove formed in one of the separable members of the coupling so as to provide a leak-proof joint resistant to vibration between engaged male and female members.

The invention contemplates a coupling wherein a ported male member is provided with a recess or latching channel for the reception of latching means carried by a ported female member, the latching means being externally manipulatable whereby the members can be readily connected and effectively interlocked by merely inserting the male member into the female member.

The invention has for an object a simplified fluid-tight swiveling coupling which may be quickly connected or disconnected and wherein a locking device may, by a single manual movement, be made to positively lock the parts of the coupling together.

Another object of the invention is the provision of a coupling for connecting the ends of flexible conduits providing a leak-proof joint without subjecting the conduits to twisting and which does not require the use of swiveled end fittings.

Another object of the invention is the provision of a self-sealing coupling of minimum outside diameter for a given flow capacity adapted for use in quickly connecting or disconnecting the ends of conduits adapted to convey fluids under pressure and which can be locked against accidental separation by using a key or cotter-pin.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like characters designate correponding parts in the several views.

Referring to the drawings:

Fig. 1 is an elevational view showing a conduit with its connections to which the invention has been applied;

Fig. 2 is an elevational view in section of the detachable coupling incorporating the invention;

Fig. 3 is an exploded view of the female portion of the detachable coupling;

Fig. 4 is an exploded view of the male member;

Fig. 5 is a plan view in section taken along the line 5—5 of Fig. 2;

Fig. 6 is a plan view in section taken along the line 6—6 of Fig. 2;

Fig. 7 is a plan view in section taken along the line 7—7 of Fig. 2;

Figure 8:
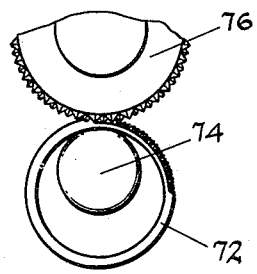
Fig. 8 is an elevational view showing the method of forming one member of the coupling.

Referring to the drawings, particularly to Fig. 1, a flexible conduit 14 is shown having attached to its ends a pair of male coupling members 16 and 18. The coupling member 16 has a threaded portion 20 fitted into a threaded aperture in a pressure envelope 22 whereby fluid pressure may enter the coupling 16 and be communicated by means of the flexible conduit 14 to the second male coupling member 18 at its distal end where it cooperates with a female portion 24 which is in communication with a second pressure envelope 26 by means of a pipe 28 in threaded cooperation with the envelope 26 and the female member 24.

The present invention contemplates the provision of a coupling means between the male member 18 and the female member 24 which is readily attachable and detachable from or to a cooperative relation without the use of tools, means being provided to form a seal between the members when they are in cooperative position. The relation between the male member 18 and the female member 24 allows relative rotation therebetween so as to allow the male coupling member 16 to be engaged by its threaded portion 20 with the pressure envelope 22, with the male portion 18 in coupled relation with the female member 24. The male coupling member 16 is fixedly attached to the conduit 14, so that there is no relative rotation therebetween. These couplings are well known in the art and need not be described in further detail.

Referring now to Fig. 2, the male coupling member 18 consists of a cylindrical male engaging portion 30 provided with an annular groove 32 adjacent its central location for sealing purposes which will be described in further detail hereinafter. At the rear end of the engaging portion 30, an integral, threaded nipple 34 is provided which enters the conduit 14, being somewhat larger than the central aperture therein and held fixedly thereto by means of an outer sleeve 36, into which is screwed into close engagement therewith the threaded nipple 34 to form a leak-proof joint between the conduit and the male engaging portion 30 whereby fluid pressure in the conduit 14 may be transmitted by a central aperture 38 of the male coupling member to the female coupling member 24 which is provided with an eccentric bore 40 into which the engaging portion 30 snugly fits when in cooperative relation therewith. The bore 40 is in communication with the pipe 28 fitted into the female member 24 which is placed thereby in communication with the pressure envelope 26. The construction already described allows fluid pressure in the pressure envelope 22 to be communicated to the fluid pressure envelope 26 via the conduit 14 and the coupling members already described. It is clear that the fluid pressure may also be communicated in the opposite direction.

The cylindrical coupling portion 30 is sealed in the eccentric bore 40 of the female member 24 by the means of a sealing member 42 positioned in the annular slot 32. The sealing member 42 is torus-shaped, being preferably made of soft rubber or the like having a circular cross-section slightly larger in diameter than the depth dimension of the annular slot 32. The diameter of the aperture of the toroidal sealing member 42 is slightly smaller than the diameter of the bottom of the annular groove 32 in the portion 30, so that when the sealing member is positioned in the slot 32, it will snugly embrace the bottom thereof. When the male coupling portion 30 is disengaged from the bore 40 with the sealing member 42 positioned in the annular slot 32, the overall dimension of the sealing member is such that its outer diameter is slightly larger than the outer diameter of the coupling portion 30, so that when the coupling portion is positioned in the bore 40, the sealing member 42 is placed under compression to change its cross-section from a circle to a flattened ellipsoid, as is most clearly shown in Fig. 2.

The sealing member is commonly called an "O-ring" and, by the construction already described, is placed under compression so as to give a tight contactual relation both with the bore 40 and with the bottom of the annular slot 32 of the coupling portion 30. The fluid pressure contained in the bore 40 when the coupling is in use tends to further distort this "O-ring" and to thrust the "O-ring" to the left (Fig. 2) against the rear wall 32a of the annular slot to increase the contactual pressure between the "O-ring" or sealing member and the adjoining parts with which it is in contact. As the pressure in the bore 40 increases, this deforming pressure increases simultaneously to displace the "O-ring" into the clearance between the parts to fill the same and insure a good seal for the pressure. The greater the pressure acting in the conduit, the greater the compressive force on the "O-rings" tending to form a seal.

In order to hold the male coupling portion 30 in position in the eccentric bore 40 of the female member, a locking means is provided cooperating between the two parts being shown in assembled relation in Fig. 2 and in exploded view in Fig. 3. The locking of the parts is accomplished by a rotatable sleeve member 44 positioned on the exterior of the female member 24 having a cup-shaped conformation to provide a bottom flange 46 which terminates in an eccentric aperture 48, into which the coupling portion 30 is fitted, so that the bottom flange 46 engages annular slot 50 formed at the rear end of the male engaging portion 30.

The locking relation between the female member 24, having the eccentric bore 40, and the male coupling portion 30 is obtaind by one portion of the bottom flange 46 of the sleeve 44 as defined by the eccentric aperture 48, engaging the slot 50 when the eccentricities of the aperture 48 and the bore 40 in the members 44 and 24 respectively are in opposed relation as is most clearly shown in Fig. 5. With the eccentricities of the aperture and the bore in alignment, the male coupling portion 30 is readily inserted into the bore 40 of the female member 24 but when this alignment of eccentricities is changed, the bottom flange 46 creates an overhang 46a which drops into the slot 50 at the rear end of the male coupling member 30 to create a locking means to prevent movement in either direction. Further engagement is prevented by the bottom flange 46 engaging the head 36a of the nipple 36, and disengagement is prevented by the overhang 46a engaging the slot 50.

In order to assure permanent engagement between the ported male and female parts of the coupling, the eccentricities of the bore 40 and the aperture 48 of the female member are normally spring biased to opposed relation, being subject, however, by manual manipulation to aligned relation to allow ready engagement and disengagement of the male and female parts of the coupling. The structure, to attain this function, will now be described.

As has already been described, the cup-like sleeve member 44, having its bottom pierced by eccentric aperture 48 to define the bottom flange 46, is rotatably mounted on the exterior of the female member 24, and held thereon by means of an inwardly struck lug 54 adjacent a central location which cooperates with the front wall 56 of an annular groove 58 on the exterior of the female member 24 and also with the forwardly-bent end 60 of a spring member 62 positioned in the groove 58 as shown. The lug 54 is positioned approximately 90° counterclockwise from the symmetrical axis of the eccentric aperture 48, measuring from the narrow side of the flange looking from the left in Fig. 2. The rearwardly-bent end 64 of the spring member 62 is anchored in an aperture or groove 66 in the rear wall 59 of the groove 58. A slot 68 is provided approximately 180° removed from the aperture 66 to extend from the groove 58 to the end of the female member 24, to allow ready entrance of the lug 54 into the groove 58 to cooperate with the front end 60 of the spring member 62. Both aperture 66 and slot 68 are located on the symmetrical axis of the eccentric bore 40, aperture 66 being on the narrow side and slot 68 on the wide side as is best seen in Fig. 3.

To mount the flange sleeve member 44 on the end of the female member 24, as shown in Fig. 2, the spring 62 is first expanded and positioned on the member 24 and, upon contraction, is mounted in the groove 58, with its rear end 64 positioned in the groove 66. The spring member in normal condition is slightly larger in diameter than the inside diameter of the sleeve 44, with which it will lock when substantially in expanded relation. With the spring 62 mounted in the groove 58, as described, it is wound up (approximately 180°) to contract against the bottom of the groove from its anchor in the aperture 66 and its forward end is temporarily retained in the axially aligned hole 70 in the front wall 56 of the groove 58. As the flanged sleeve member 44 is positioned on the exterior of the member 24, with the lug 54 negotiating the slot 68, the lug 54 will engage with the forward turns of the spring 62 and, upon counterclockwise turning in the groove 58, will thrust the forward turn to the rear to disengage the end 60 from the hole 70 to release the spring, whereby the end 60 will engage the lug 54 to bias the sleeve member 44 in a clockwise direction (from the left, Fig. 2) relative to the member 24 until the spring has expanded to snugly engage the inside of the sleeve 44 to grip the same by a clutching action to provide a stop means. This engagement occurs when the eccentricities of the bore 40 of member 24 and the aperture 48 of the sleeve 44 are in opposed relation after movement of approximately 180° from the aligned relation of the eccentricities. The spring bias normally holds the sleeve member 44 in the position where such opposed relation takes place in order to maintain the locked relation between the male and female parts of the coupling.

To engage or disengage the ported male and female elements of the coupling, the sleeve member 44 must be turned manually counterclockwise against the bias of the spring 62 until the eccentricities of the bore 40 and the aperture 48 are in alignment, this being approximately 180° from the spring biased locked position. For convenience, a knurled sleeve 72 is press-fitted to the outside of the sleeve member 44 to give a roughened surface for gripping the sleeve for manual manipulation. The sleeve 72 has the further function of closing the opening 54a in the sleeve member 44 adjacent the lug 54. Preferably the sleeve 72 is made from an extension of the same dimension cut from the end of the sleeve member 44, the outer knurling being provided as shown in Fig. 8 on an inner rotating mandrel 74 cooperating with the outer knurling tool 76. This increases the diameter of the knurled sleeve to give the desired press fit on the exterior of the sleeve member 44.

A second stop is provided with the eccentricities of the bore 40 and the aperture 48 in alignment by the spring member 62 wrapping about the bottom of the groove 58, when being manually manipulated for engagement and disengagement as already described. It is to be understood that by winding the spring 62 in the opposite direction to reverse the biasing thereof on the sleeve 44 to a counterclockwise direction, and reversing the manual manipulation to a clockwise direction, a workable modification is feasible, falling within the purview of the invention.

Figure 10:
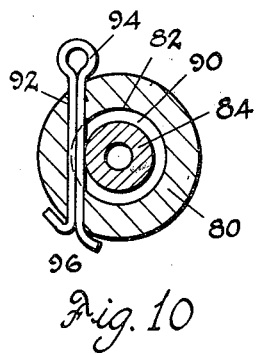
Fig. 10 is a plan view in section taken along the line 10—10 of Fig. 9.
Figure 9:
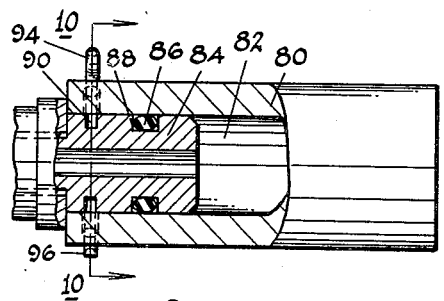
Fig. 9 is an elevational view partly in section of a modification of the invention.

In the modification shown in Figs. 9 and 10, a female member 80 is provided with a concentric bore 82, into which is fitted the male coupling member 84 also provided with an "O-ring" 86 positioned in its cooperating annular slot 88 in a manner similar to the modification already described. A second annular slot 90 is provided adjacent the rear end of the male coupling member 84 which cooperates with a transverse bore 92 in the female member 80, through which a cotter-pin 94 is adapted to project to cooperate and fit into one portion of the annular groove 90 to provide a locking means to prevent disengagement of the male and female parts and yet allow relative rotation therebetween.

The male coupling member is positioned in the bore 82 and when the annular slot 90 is in alignment with the transverse bore 92, the cotter-pin 94 is manually inserted to form the locking engagement and thereafter the ends 96 are separated, as shown, to prevent disengagement of the cotter-pin from the aperture 92. In other respects the sealing means comprising the "O-rings" 86 operates in substantially the same manner as in the modification already described.

Figure 12:
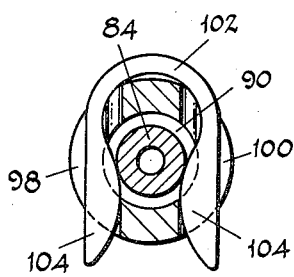
Fig. 12 is a plan view in section taken along the line 12—12 of Fig. 11.
Figure 11:
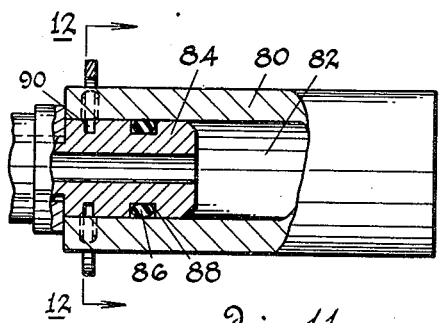
Fig. 11 is a sectional elevation showing another modification of the invention.
Figure 13:
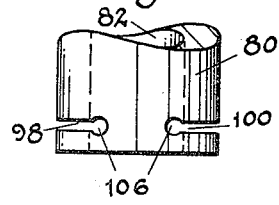
Fig. 13 is an elevational view showing a detail of construction of the modification shown in Fig. 11.

In the modification shown in Figs. 11, 12 and 13, a similar female member 80 and the male member 84 are provided, being also provided with an annular slot 90 in substantially the same manner as described with reference to the modifications shown in Figs. 9 and 10. Instead of providing a transverse bore in the female member, as described in the modification in Figs. 9 and 10, a pair of diametrically opposed transverse slots 98 and 100 are provided in the female member 80, their depth being such as to align with the bottom of the slot 90 as is best shown in Fig. 12. A hairpin type locking means 102 is provided having flat, inwardly-extending arcuate portions 104 which are resiliently urged toward each other by the yoke portion. The distance between the flat portions 104 is substantially smaller than the diameter of the bottom of the slot 90 of the male member which is adapted to be gripped resiliently by the flat members 104 to prevent disengagement of the holding means 102 from the slots 98 and 100. As shown in Fig. 13, the inner terminating portion of the slots 98 and 100 may be given a cylindrical conformation 106 which may be utilized to position a cotter-pin or the like substantially as shown in Fig. 10.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a coupling, separable tubular male and female members adapted for telescoping connection for the passage of fluid therethrough, the female tubular member provided with a longitudinal cylindrical bore extending inwardly from its end, the male tubular member having a corresponding cylindrical surface to telescope into said bore and a shoulder abutting the end of the female member limiting their telescopic relation, an annular channel on the cylindrical surface of the male member, a toroidal distortable member located in said channel and dimensioned to provide a slight clearance with the channel side walls and project beyond so as to be exposed to the pressure of the fluid flow and be deformed thereby into tight contact with one side wall of the channel and the cylindrical surface of the female member providing a fluid-tight seal between the male and female members dependent upon the fluid pressure in the coupling the effectiveness of the contact increasing as the fluid pressure increases, a groove formed on the male member, and means associated with the female member for interlocking engagement with said groove whereby the two members are disconnected only by manual intervention.

2. A quick detachable coupling of separable male and female members having aligned internal fluid passages comprising, a female tubular member provided with a longitudinal cylindrical bore extending inwardly from one end, a male tubular member having a cylindrical surface adapted to telescopically fit into the bore of the female member, a stop associated with the male member for engagement with the end surface of the female member for limiting the telescopic relation of said members, an annular groove formed on the cylindrical surface of the male member, a distortable member located in said groove dimensioned to be deformed and placed under compression by the surface of the bore of the female member when the members are placed in telescoping relation, the distortable member having a width smaller than the width of the groove so as to be exposed to the pressure of the fluid flowing through the coupling causing its radial deformation and thrusting the member into tighter contact with the surface of the bore of the female member as the fluid pressure increases to thereby provide a seal between the male and female members dependent upon fluid pressure in the coupling, one of said members provided with a recess, the other of said members formed with an opening adapted for cooperative alignment with said recess when the members are in operative engagement, and a member manipulated manually for establishing an interlocking connection between said recess and said opening whereby accidental separation of said members is prevented.

3. A quick detachable coupling of separable male and female members having aligned internal fluid passages comprising a female tubular member provided with a longitudinal cylindrical bore extending inwardly from one end, a male tubular member having a cylindrical surface adapted to telescopically fit into the bore of the female member, a stop associated with the male member for engagement with the end surface of the female member for limiting the telescoping relation of said members, an annular groove formed on the cylindrical surface of the male member, a distortable member located in said groove dimensioned to be deformed and placed under compression by the surface of the bore of the female member when the members are in telescoping relation, the distortable member having a cross sectional area when compressed slightly smaller than that of the groove so as to be exposed to the pressure of the fluid flowing through the coupling causing a radial deformation for moving and thrusting the distortable member into tighter contact with a wall of the groove and the surface of the bore of the female member as the fluid pressure increases to thereby provide a seal between the male and female members dependent upon fluid pressure in the coupling, a second groove formed on the cylindrical surface of the male member, the female member provided with an opening adapted to be in alignment with said second groove when the male and female members are coupled, and a hair pin member manually insertable in said opening for engagement with said groove for interlocking said members against accidental separation.

4. In a device of the class described, a female member of cylindrical conformation, having a smooth bore therein communicating with a system for fluid transmission, a cylindrical male member fitting within the bore of the female member to establish a coupled relation therewith for fluid transmission in the system, an annular channel in one of the members cooperating with the clearance between the members, a toroidal member of resilient material in the channel dimensioned to project beyond having slightly smaller cross sectional area than that of the channel and capable of being distorted by both the members and by the fluid pressure of the system to form a seal between the members, annular locking means on one of the members to allow relative rotation between the members when in coupled relation, and rotatable means on the other member, which when in one position creates an overhang to create the locking relation with the annular locking means, and when in a second position releases the overhang from the annular means to allow coupling and uncoupling and a spring biasing the rotatable means to the first position to maintain the locking relation between the coupled members.

5. In a device of the class described, a female member of cylindrical conformation, having an eccentric smooth bore therein communicating with a system for fluid transmission, a cylindrical male member fitting within the bore of the female member to establish a coupled relation therewith for fluid transmission in the system, an annular channel in one of the members cooperating with the clearance between the members, a toroidal member of resilient material in the channel dimensioned to project beyond and for a slight movement in the channel, the member capable of being distorted by both the members and by the fluid pressure of the system to form a seal between the members, an annular groove on the male member, rotatable means on the female member having an inwardly extending flange of variable width to define an eccentric aperture, the flange cooperating with the annular groove in the male member to create an overhang for locking the members together when the eccentricities of the eccentric aperture and eccentric bore are in opposed relation, spring means adapted to bias and lock the members when the eccentricities of the parts are in opposed relation, said rotatable means being adapted to be manually rotated against the spring bias to align the eccentricities to allow coupling and uncoupling of the members.

6. In a device of the class described, a female member of cylindrical conformation, having a smooth bore therein communicating with a system for fluid transmission, a cylindrical male member fitting within the bore of the female member to establish a coupled relation therewith for fluid transmission in the system, an annular channel in one of the members cooperating with the clearance between the members, a toroidal member of resilient material in the channel dimensioned to project beyond having slightly smaller diameter than the width of the channel and capable of being distorted by both the members and by the fluid pressure of the system to form a seal between the members, an annular means and a rotatable means cooperating with each other and positioned on the male and/or female members respectively to create a locking relation therebetween when in coupled relation, and spring means biasing the rotatable means to locked position, said rotatable means being adapted to be moved manually to unlocked position to allow uncoupling and coupling of the members.

7. In a device of the class described, a female member of cylindrical conformation, having an eccentric smooth bore therein communicating with a system for fluid transmission, a cylindrical male member fitting within the bore of the female member to establish a coupled relation therewith for fluid transmission in the system, an annular channel in one of the members cooperating with the clearance between the members, a toroidal member of resilient material in the channel dimensioned to project beyond and for a slight movement in the channel, the member capable of being distorted by both the members and by the fluid pressure of the system to form a seal between the members, an annular groove in the male member displaced rearwardly of the toroidal member, rotatable sleeve-like means on the female member having an inwardly-extending flange of variable width to define an eccentric aperture capable of being aligned with the eccentric bore of the female member, said flange cooperating with the annular groove in the male member to create an overhang extending into the groove for locking the members together when the eccentricities are in opposed relation, spring means positioned within the sleeve to bias and lock the sleeve with the eccentricities in opposed relation, said locking action by the spring being created by an expanding clutch action, the sleeve being adapted to be manually rotated against the bias of the spring to align the eccentricities to allow coupling and uncoupling between the male and female members.

JAMES MARK LAUNDER.

REFERENCES CITED

The following references are of record in the file of this patent:

UNITED STATES PATENTS

| Number | Name | Date |
|---|---|---|
| 904,673 | Bideker | Nov. 24, 1908 |
| 2,021,241 | Mall | Nov. 19, 1935 |
| 2,081,571 | Baade | May 25, 1937 |
| 2,102,774 | Williams | Dec. 21, 1937 |
| 2,368,270 | Samiran | Oct. 9, 1945 |
| 2,428,077 | Herold | Sept. 30, 1947 |